July 9, 1974     D. GIDASPOW ET AL     3,823,038

CONTINUOUS BLEED FUEL CELLS

Original Filed July 24, 1969     3 Sheets-Sheet 1

CONCENTRATION DISTRIBUTION
AT SPECIFIED TIMES, $\theta$

Inventors:
Dimitri Gidaspow
Robert W. Lyczkowski
Bernard S. Baker

By Bair, Freeman & Molinare Attys.

PRESENT INVENTION
STEADY STATE DISTRIBUTION
AT SPECIFIED BLEED RATE

Inventors:
Dimitri Gidaspow
Robert W. Lyczkowski
Bernard S. Baker

By Bair, Freeman & Molinare
Attys.

Inventors;
Dimitri Gidaspow
Robert W. Lyczkowski
Bernard S. Baker

By Bair, Freeman & Molinare
Attys.

United States Patent Office 3,823,038
Patented July 9, 1974

---

3,823,038
CONTINUOUS BLEED FUEL CELLS
Dimitri Gidaspow, Robert W. Lyczkowski, and Bernard S. Baker, Chicago, Ill., assignors to Institute of Gas Technology, Chicago, Ill.
Continuation of application Ser. No. 844,406, July 24, 1969. This application Mar. 6, 1972, Ser. No. 232,214
Int. Cl. H01m 27/00
U.S. Cl. 136—86 R                               1 Claim

---

ABSTRACT OF THE DISCLOSURE

Apparatus and method of operation of fuel cells by means of a controlled bleed at the "dead-end" of electrode gas compartments to continuously remove impurities, inevitably present in even ultra-pure fuels, which accumulate and cause a drop in voltage and current during the lifetime of the cells. The bleed at such locations establishes a steady state fuel-impurity concentration distribution in the cell resulting in improved electrical characteristics. The preferred rate of bleed may be only slightly greater than the percentage of input of impurities or inerts coming in with the reactant or fuel gas. The complicated and heavy valving apparatus, undesirable voltage transients, power interruption, and permanent loss of electrolyte of prior art periodic or recycle purge systems are avoided by the pesent constuction and method. Apparatus and method of providing supplemental thrust for spacecraft propulsion, navigation and altitude control are also disclosed.

---

This is a continuation of application Ser. No. 844,406, filed July 24, 1969, now abandoned.

This invention is directed to apparatus for, and method of operation of, fuel cells which utilize nearly pure reactants such as hydrogen and oxygen fed into gas compartments which are normally dead-ended.

Fuel cells generally consist of the following five components in an appropriate housing: 1 an anode gas chamber, 2 an anode, 3 an electrolyte, 4 a cathode, and 5 a cathode gas chamber. When hydrogen and oxygen or similarly pure reactants are used as fuel and oxidant and where the product of reaction is a condensable gas such as water vapor, it is a common practice to make either the anode gas chamber or cathode gas chamber dead-ended. Such designs have been used recently, for example, on the oxygen or cathode chamber of the Apollo fuel cell and for both the oxygen and hydrogen chamber of the matrix-type fuel cell which may be used in the fuel cell for manned orbiting laboratories (MOL).

Even though the hydrogen and oxygen used in these fuel cells is of high purity, there are inevitably some impurities present in these reactants. These impurities are in the form of non-condensable gases, such as nitrogen, helium, argon, or the like. During the course of operation of these dead-ended cells, the reactant gases, fuel and oxidant, are continuously consumed and converted into water which is then removed from the cell. In the case of the above-mentioned Apollo fuel cell the product water was removed by recirculation of the hydrogen gas through a water condenser. In the case of the MOL fuel cells the water is removed through a water transport membrane located within the anode chamber of the fuel cell, through which water vapor is extracted by means of a pressure differential between the anode chamber (about 2 atmospheres pressure) and a vacuum or low pressure (0.5 p.s.i.a.) chamber placed on the opposite side of the membrane.

When the cell is dead-ended, the non-condensable impurity accumulates, in terms of increasing concentration. The accumulation of these impurities causes a sharp drop in the operating voltage of the cell and a non-uniform current distribution within the cell. Both of these features are most undesirable. As a result, it is common practice to periodically purge the electrode chambers of the impurity. However, this periodic purging causes undesirable voltage transients, and may result in temporary interruption of power and permanent loss of electrolyte. These, it is believed, ultimately lead to total cell failure. Moreover, to accomplish the periodic purging, a complicated set of purge valves and electronic control equipment is required. This equipment lowers the overall system reliability and adds to the weight of the system without increasing the system's power capability, resulting in a loss in efficiency in terms of the power to weight ratio. Furthermore, because the impurity is allowed to accumulate between purges, the drop in cell voltage necessitates complex voltage regulation equipment to insure delivery of a steady voltage level from the power plant during operation.

A system directed to an attempt to overcome the drawbacks of the periodic purge system is the periodic recycle system wherein reactant gas, either fuel or oxidant, is recycled through a loop which is periodically purged. While this mode of operation eliminates some of the transients in the cell, it does add complexity and weight to the fuel cell system because of the need for gas recycle and periodic purge equipment. In fact, in recent manned space flights the cells were manually purged because of the above mentioned complexities. However, the manual purging places yet another burden on the astronaut already functioning in a different and difficult environment. Furthermore, this recycling approach results in lower system efficiency because the purge is non-discriminatory, i.e., a substantial portion of reactant is lost during the purge yet only part of the impurities are removed. Also the weight efficiency of the cell is not significantly improved.

It is, therefore, among the objects of this invention to provide a fuel cell and method of regulating its operation such that the improved fuel cell operates at steady state conditions, delivering a steady voltage output, and high efficiency.

It is an object of this invention to provide such a fuel cell with a simple, practical structure which is reliable in operation, and lighter than periodic purge or recycle purge systems.

It is an object of this invention to provide a means for removing impurities before they accumulate to a level affecting voltage and power and necessitating special voltage regulation equipment.

It is an object of this invention to provide a means for the elimination of undesirable transients in voltage, reactant gas flow, and electrolyte inventory during the course of fuel cell operation.

It is another object of this invention to eliminate the valves and attendant electronic control equipment currently used to implement periodic or recycle purging of fuel cells, and thereby improve the lifetime power output and the power to weight efficiency ratio.

It is another object of this invention to provide a fuel cell system which delivers a higher energy per unit weight and higher reliability by virtue of elimination of the above-mentioned valves and electronic equipment.

It is another object of this invention to provide a novel spacecraft, and apparatus and method for augmenting, replacing, or supplementing spacecraft thrust means used for propulsion, navigation, or altitude control by use of purge gas from our fuel cell assembly.

Further objects of this invention will be evident in the detailed discussion and the non-limiting illustrative examples that follow.

The prior art problems are overcome and the above objects met by our invention which provides for continuous purging of gas direct from the fuel cell electrode chambers themselves. By this invention a predetermined amount of the inerts which accumulate near the dead-ended portion of the gas compartments can be removed by proper location of a continuous bleed of predetermined flow characteristics, and which bleed establishes a steady state reactant gas-impurities concentration distribution throughout the cell. The configuration of the distribution may be thus predetermined to meet various load characteristics. Essentially only inerts and small quantities of reactants are removed if the rate of bleed is slightly greater than the percentage of inerts and/or impurities coming in with the reactants. The purge may be direct to vacuum, as in the case of a satellite or spacecraft, or indirect to a low pressure vessel, common to a number of cells, from which the accumulated inerts can be recovered or expelled when and as desired.

The detailed description of our invention is faciliated by reference to the accompanying figures wherein:

FIG. 1 depicts schematically a hydrogen-oxygen fuel cell;

FIG. 2 graphically illustrates the dead-ended impurity and reactant concentration distributions as a function of time and spatial coordinates along the line 2—2 of FIG. 1;

FIG. 3 graphically illustrates the steady-state impurity and reactant concentration distribution for various amounts of continuous bleed provided at the dead-end of the cell according to the present invention;

Figure 4:
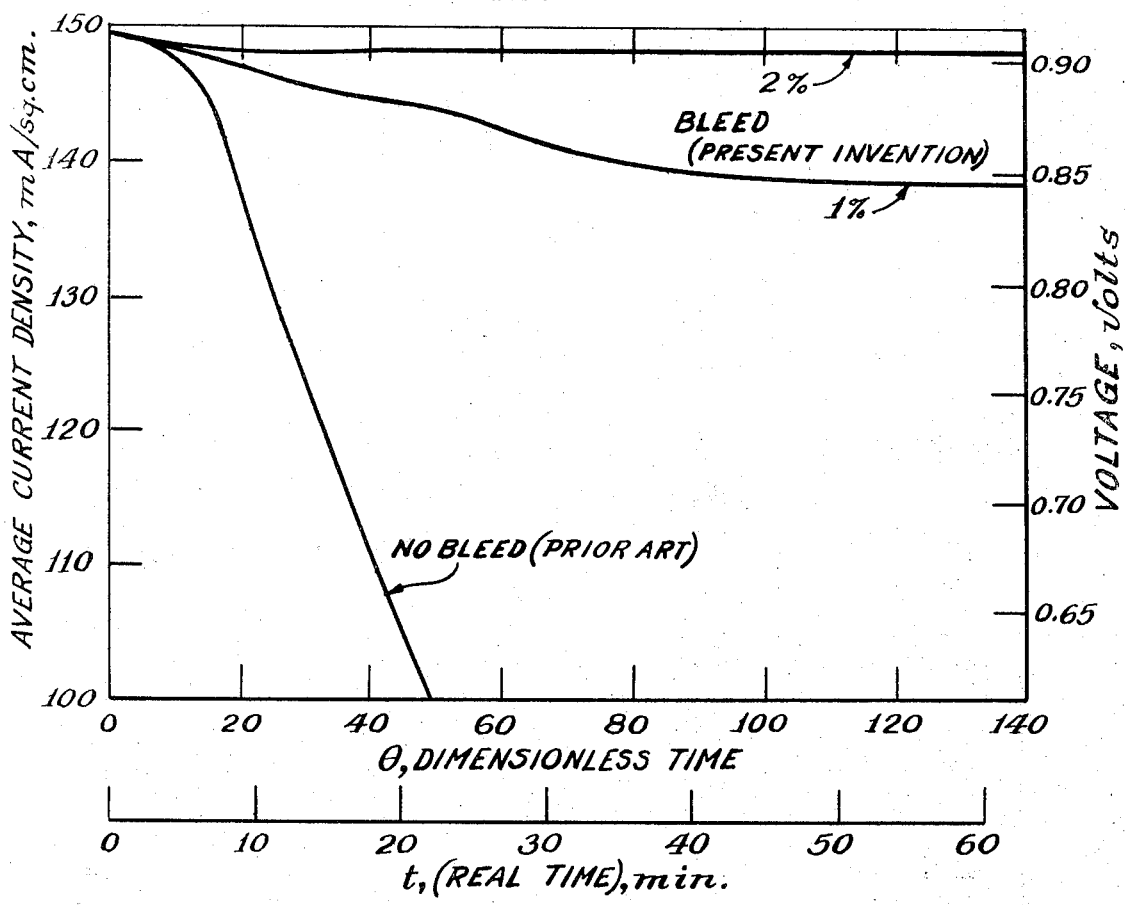

FIG. 4 graphically illustrates both the average current density and the voltage as functions of time for both prior art fuel cells and the continuously bled fuel cells of this invention; and FIG. 5 graphically illustrates the relationship between current and percentage of bleed for both the steady-state oxygen loss rate and the steady-state current drop below initial operating point due to inert buildup.

Our work has confirmed that in dead-ended fuel cell gas compartments, the inerts or impurities present in the reactant gases tend to accumulate at the dead-ended portion of the cell. Contrary to what might be expected of a flow-through gas compartment, we have discovered that substantially any desired percentage of these impurities can be removed, to the substantial exclusion of also removing the fuel, by a continuous bleed from the dead-end of the cell. As noted below in more detail with respect to FIG. 2 our work shows the accumulating inerts or impurities form a concentration distribution which continuously changes in time. Surprisingly, we have discovered that by providing a continuous and calibrated bleed direct from the dead-end of the cell and spaced from the reactant gas inlet port, the continuously changing distribution is halted and a steady-state condition may be achieved with a predetermined minimum percentage of reactant concentration in the entire cell. In addition we find that the impurities may be removed preferentially. While some portion of reactant gas is removed, the bleed can be chosen or adjusted so that substantially no significant portion of the fuel gas is removed while continuously removing inerts. Quite significantly, our cell pressure remains constant and both the average current density and the average voltage curves of the cells are strikingly improved as shown particularly in FIG. 4.

Figure 1:
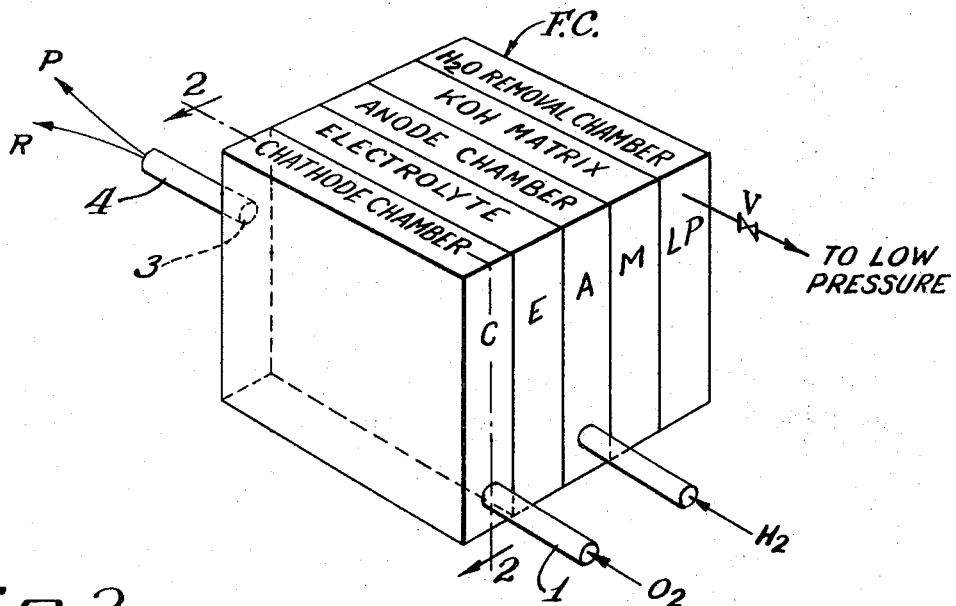

Turning now to FIG. 1, this figure shows schematically a fuel cell FC, comprising a low pressure chamber LP, an anode chamber A separated from the low pressure chamber by a KOH matrix or membrane M, an electrolyte chamber E (here with alkaline electrolyte), and adjacent thereto a cathode chamber C. For purposes of the discussion, and by way of illustration but not by way of limitation, the fuel cell utilizes "pure" hydrogen gas and "pure" oxygen gas piped into the anode chamber and cathode chamber respectively. As the hydrogen gas reacts at the anode chamber electrode surface, water is produced (if the electrolyte is acid, water forms at the cathode and if the electrolyte is alkaline, water forms at the anode). This water is removed by passage through the membrane M into the low pressure chamber LP. Typical operating parameters are 2 atmospheres pressure and temperature of 180–200° F. The water can be removed from the chamber LP by conventional means such as the valve V shown schematically connected to the low pressure chamber LP, after the water is absorbed by a conventional matrix M containing, e.g. 37.5 weight percent KOH solution. As an alternative, a water permeable membrane can be used in place of the matrix.

In the cells of prior art, still referring to FIG. 1, a purge port 3 is provided in the cell wall opposite that through which the oxygen line 1 enters. This purge port 3 is designed to permit large amounts of gas to be expelled from the electrode gas chamber over a short period of time. Although shown only with respect to one electrode gas chamber, it should be understood that purge ports may be also associated with both electrode gas chambers since both of the reactant or fuel gases inevitably contain a certain amount of impurities or inerts.

Figure 2:
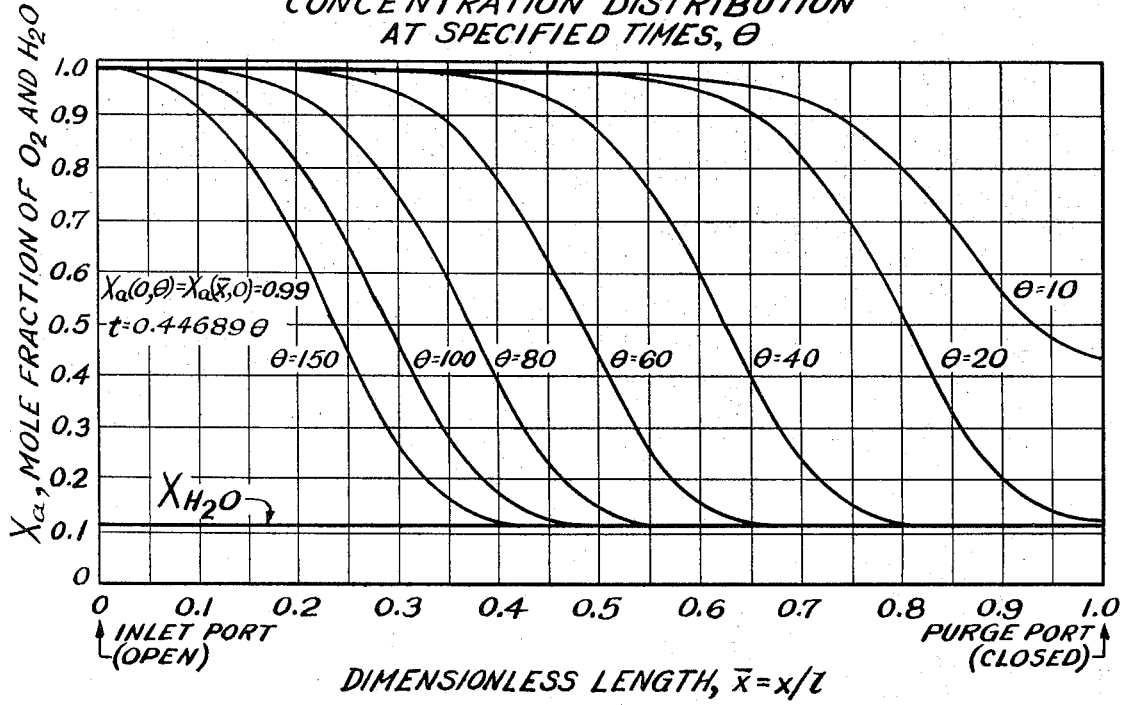

Even though only a small percentage of impurity or inert enters with the reactant or fuel gas, for example say only 1%, after but a short time the concentration percentage increases, particularly at the dead-end of the cell. As time goes on, the inert-reactant concentration distribution continuously changes, the curve of reactant concentration moving to the left as seen in FIG. 2, that is away from the purge port 3 toward the input line 1. The inerts blanket an increasing area of the electrode along the face of the gas chamber and result in a drop of cell current and voltage.

What is presently done in the periodic purge type of cell is to periodically open purge port 3 to a source of reduced pressure, causing a substantial amount of the reactant gas to sweep out ahead of it the inerts in the direction P in FIG. 1 as fresh, inlet fuel is forced in via tube 1. Almost inevitably, the voltage drops momentarily during the purge to a lower level. The reason for this drop is not fully understood but may be caused in part by a partial drying out of the moist electrode surface. After the purge valve 3 is closed, the performance level is restored to nearly the original level. As soon as the valve to the lower pressure is closed, the rate of entrance of the fresh fuel decreases to the pre-purged level, and inerts begin to accumulate once again. Likewise, performance again begins to drop off, and the subsequent purges complete the cycle. The electrical history of such a prior art cell is shown in the curve on the left in FIG. 4 marked "No Bleed." This curve shows both the average current density and average voltage as functions of time during the between-purge periods. Both the current density and voltage drop off rapidly in time due to the blanketing of the electrode by the inert. After purge, the curve would rise back toward, but not quite reach, the original average current density or average voltage level. Again the values fall off in time until the subsequent purge. Where frequent purges are required, as where the average current density or voltage must be kept high due to load requirements, a substantial amount of reactant gas is lost over a period of time.

A similar type of situation is involved with the type of cells employing a non-discriminatory recycle in which a tube (such as 4 in FIG. 1) is led away from the cell (direction R in FIG. 1). A portion of the gas passing through the tube is bled off, usually intermittently while the remainder is recycled in the inlet tube 1. In addition, fresh make-up gas is added to the inlet tube 1 to compensate for the volume and pressure loss of the purge. In FIG. 1, the symbols P and R represent the periodic purge and the recycle purge systems of the prior art, respectively.

By way of example, a hydrogen-oxygen fuel cell model is set up with the following parameters: Electrode area of 0.1904 sq. ft., fuel cell length "$l$" of 0.5618 ft., chamber height "$h$" of 0.00406 ft. The values for the oxygen reactant were calculated, since hydrogen is normally obtainable in a more pure state. The impurity considered was the inert gas argon, the binary diffusion coefficient "$D_{ab}$" of oxygen-argon being 0.61 sq. ft./hr. From these parameters the dimensionless diffusion coefficient D* can be obtained according to the equation:

$$D^* = D_{ab} h n F C / l^2 I_o \qquad (1)$$

where "$D_{ab}$" is the binary diffusion coefficient of reaction gas "$a$" in inert gas "$b$" in sq. ft./hr.; "$h$" is the fuel cell chamber height; "$n$" is the number of lb.-equivalents per lb.-mole of the reactant gas, in this case oxygen=4; "$F$" is Faraday's Constant, 12,158 amperes-hours/ol.-equivalent; "$C$" is the total molar concentration, here a constant, in lb.-moles/cu. ft.; "$l$" is the fuel cell chamber length in feet; and $I_o$ is the average current density in amperes/sq. ft.

The concentration distribution curve of FIG. 2 and its behavior in time was then obtained analytically by forming a mass balance on the fuel cell gas chamber. This involves a species conservation equation (2) below, and a continuity equation (3) below used in the derivation of the conservation equation. The species conservation equation equates the sum of the accumulation and the convection of the reacting gas "$a$" to the sum of its diffusion and consumption rate:

$$\frac{\partial X_a}{\partial \theta} + \bar{v}^* \frac{\partial X_a}{\partial \bar{x}} - X_a \bar{I} = D^* \frac{\partial^2 X_a}{\partial \bar{x}^2} - \bar{I} \qquad (2)$$

where: $X_a$ is the mole fraction of reacting gas "$a$"; is the dimensionless velocity=$v^*$/

$\bar{v}^*$ is the dimensionless velocity=$v^* / \left( \frac{I_o l}{h n F C} \right)$, where $v^*$ is the molar average velocity in ft./hr.; $\theta$ is the dimensionless time=$tI_o/hnFC$, where $t$ is time in hours; $\bar{x}$ is the dimensionless scaled fuel cell length or space coordinate=$x/l$, where $x$ is the space coordinate in feet; and $\bar{I}$ is the scaled current function, a function of $X_a$ discussed in more detail below.

The continuity equation (3) involves the addition of a species equation for the inert gas and water vapor to the species equation (2) for the reactant gas, with the fact that the total molar density C, in the cell chamber remains constant. Thus the resultant continuity equation assumes the dimensionless form:

$$\frac{\partial \bar{v}^*}{\partial \bar{x}} = -\bar{I} \qquad (3)$$

Equation (3) is also employed to obtain the velocity distribution $\bar{v}^*$. The conditions of constraint are that initially the mole fractions of oxygen and water vapor are constant. Gas "$a$" with impurity "$b$" enters at one end of the fuel cell, i.e., where the scaled fuel cell length $\bar{x}$=0. At the far end of the cell a zero gradient exists and the desired amount of bleed is set. These conditions stated mathematically are:

$$X_a(0, \bar{x} = X_a^o)$$

where $X_a^o$ is the mole fraction of reacting gas at position $\bar{x}$=0;

$$X_a(\theta, 0) = X_a^i \qquad (5)$$

where $X_a^i$ is the mole fraction of reacting gas at time $\theta$=0;

$$\frac{\partial X_a(\theta, l)}{\partial \bar{x}} = 0 \qquad (6)$$

and $$\bar{v}^*(\theta, x) = \int_{\bar{x}}^1 \bar{I} d\bar{x} + \bar{v}^*(\theta, l). \qquad (7)$$

During the operation of the dead-ended fuel cell the molar averaged molecular velocity is zero, $\bar{v}^*(\theta,l)$=0, while during the continuous bleed, its value is assigned according to a predetermined bleed rate. It is not necessary to begin a cell with a uniform concentration of reacting gas. An arbitrary concentration distribution is as easily calculable as the uniform case. KOH is used to remove water rather than a membrane open to a low pressure source. Water vapor is assumed to distribute itself uniformly throughout the cell at the equilibrium partial pressure of water vapor over a KOH solution. At typical operating conditions, i.e. 194° F. and 36.7 p.s.i.a., the parial pressure of water vapor is 11 mole percent, or approximately 240 mm. Hg for a 37.5 weight percent KOH solution.

The scaled current function $\bar{I}$ used in the above calculations was obtained by piece-wise linear aproximation from an actual polarization curve, which may be obtained in either of two ways: In the first case the reactant gas, here oxygen, with desired amounts of impurity is passed rapidly over an electrode surface at constant pressure while completely pure gas is passed over the other electrode surface. Alternately, the pressure of pure reactant gas may be changed in one chamber. The important fact is that polarization curves must be obtained at different partial pressures of the reactant gas. As noted above, the polarization data used was for an oxygen chamber since high purity hydrogen is more readily available, and presents less of an impurity build-up problem.

The approximation used for I, the unscaled current density in ma./sq. cm. is:

$$I = 130 + 20 \cdot X_a (0.35 \leq X_a \leq 1.0); \qquad (8)$$
$$I = 77.7 + 169.5 X_a (0.153 \leq X_a \leq 0.35); \qquad (9)$$
$$I = -265 \cdot 1088 + 2410 \cdot 08 X_a (0.11 \leq X_a \leq 0.153); \qquad (10)$$

and below $X_a$=0.11, I is zero. These equations are obtained by a piece-wise linear fit of the I vs. $X_a$ curve obtained from the experimental polarization curve. It is assumed that there is a constant external resistance equal to the slope of the polarization curve at the nominal operation point of the cell. For the purposes of this non-limiting example, a nominal operating point of 150 ma./sq. cm. at a pressure of 36.7 p.s.i.a. was used. The slope of the polarization curve is 6.095 ohm-sq. cm. This resistance is actually the sum of the internal and external resistances, but since the external resistance is assumed to be so much larger than the internal resistance, the value is constant.

Calculations are done using the method of finite differences, as assisted by digital computer. The results of the exemplary model for the conventional prior art dead-ended cells in the no-bleed or zero-bleed mode between purge periods are shown in FIG. 2. The curved lines of the Figure are the concentration curves in units of mole fraction of the oxygen and water for different times as a function of the fuel cell length. Each curve represents the concentration distribution throughout the length of the cell for a given period of time after the purge port is closed and the inlet port opened. The time $\theta$ is dimensionless to show the characteristic curve and the change in time rather than a specific curve for a specific time, fuel cell length and impurity concentration. A point on any one of the curves for a given value of $\theta$ gives the value of the sum of the mole fraction of equilibrium water vapor and oxygen. The difference is made up of the inert which entered with the oxygen. For purposes of this example a 1% amount of impurity (assumed to be argon) was chosen as entering the cell with the oxygen. This condition would be represented in FIG. 2 by point at $\bar{x}$ equals 0, the position at the inlet port, and $X_a$ equal 0.99. This indicates that at the position immediately adjacent the inlet port, the mole fraction of oxygen and water vapor is 99%. Where in actual practice the oxygen is more pure than 99%, or hydrogen is used, the characteristic family of curves would be displaced upward, but the curve shape would remain substantially the same. The lower asymptote of all the curves meets the $XH_2O$ line, the constant equilibrium mole fraction of water vapor over a 37.5 weight percent potassium hydroxide solution at a total pressure of 36.7 p.s.i.a. and a fuel cell operating temperature of 194° F.

Looking at the right-hand curve in FIG. 2, where $\theta=10$ time units after opening of inlet port and closing of purge port, the concentration is seen to be not uniform in the cell. At the position immediately adjacent the inlet port, $\bar{x}=0$, the impurities only amount to 1% mole fraction concentration in the cell and as exposed to the electrode. Moving horizontally to the right in the Figure corresponds to a movement from the inlet port toward the purge port 3 as seen in FIG. 1. However, the Figure shows that the inert accumulates at the dead-ended portion of the cell quite rapidly. At a position of slightly less than three-fourths of the way between the inlet port and purge port, the inert has accumulated in an amount of 10 mole percent with a corresponding reduction in the efficiency of the electrode at that position. Similarly, at the position adjacent the purge port, the impurity is about 56 mole percent as compared to the 44 mole percent of oxygen and water vapor. The electrode at that position would be correspondingly reduced in efficiency since there is less available fuel.

As time passes in the operation of a conventional dead-ended cell, the concentration distribution of impurities changes throughout the cell. 20 time units after the inlet port is opened and the purge port closed, the concentration of available oxygen for the production of power at the electrode is only about 1% at the electrode area adjacent the purge port. 40 time units later, almost 20% of the cell electrode area has substantially no available oxygen, and the average voltage and average current density is correspondingly dropping-off in the cell, as can be seen from the left-hand curve of FIG. 4. 100 time units later, more than half the cell electrode is receiving no oxygen. Thus, as time goes on, the inert in effect begins to blanket the electrode resulting in a drop of cell current voltage efficiencies. At some point during the operation of the cell, prior art workers chose to purge the entire cell by opening the purge port to a source of low pressure for a short time to blow out the inerts blanketing the electrode. The concentration pattern as shown in FIG. 2 would then repeat until the cell is chosen to be cleared again by purging.

It should be emphasized that FIG. 2 is merely illustrative of the characteristic curves, and may be taken as typical of those that may be generated by the use of a particular polarization curve in the calculations as set forth above. Where the general functional dependence of current on reacting gas concentration differs according to the use of a somewhat different cell, the resulting concentration results will look generally the same and behave similarly in time, but the particular position and exact slope of the curve may be somewhat different. In addition, the entering gas purity may vary either arbitrarily, or as to the source and method of production of the oxygen or hydrogen, and may be even taken as a function of time.

Figure 3:
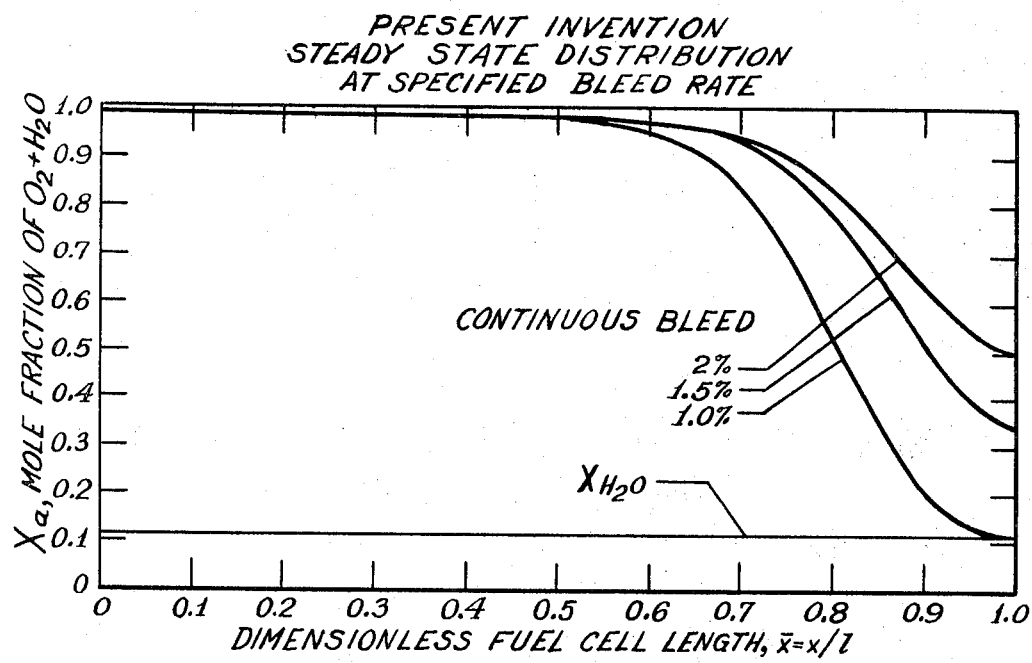
FIG. 3a shows one type of continuous bleed construction with an alternative embodiment shown in phantom lines.
FIG. 3b shows a second embodiment of the continuous bleed.
FIG. 3c shows schematically a spacecraft utilizing the continuous bleed for thrust purposes.
FIG. 3d shows partly in plan view and partly in section a third embodiment of the continuous bleed in a coil form exterior of a spacecraft.

By using the continuous bleed method and apparatus of the present invention, the continuously changing concentration gradient within the cell is transformed into a steady state concentration curve distribution. For each specific amount of continuous bleed introduced at the "dead-end" of the cell, the concentration distribution will vary as shown in FIG. 3. For a minimum bleed, which is a rate equivalent to the percentage of impurities incoming with the reactant gas, the concentration distribution of oxygen in the cell will follow a curve such as that shown for the 1% continuous bleed in FIG. 3. In that example, only at the dead-end of the cell position, will the oxygen concentration be low. With the continuous bleed placed at the dead-end of the cell, there is no longer a continuous increase of the inerts in the direction of the inlet port, but, instead, a definite steady state condition which remains constant in time is achieved. The higher the bleed rate, the faster it reaches a steady state, and the greater the concentration of reactant gas is over the formerly "dead-end" positions of the electrode, $\bar{x}=1.0$, as seen in the upper two curves in FIG. 3.

We find bleed rates of from 1 to 5 times the impurities or inerts percentage to be satisfactory for most operations with a range of 1 to 2 times the impurities percentage to be preferred. For example, if the direct bleed rate is increased to a continuous rate of 2 times the percentage impurity (2% bleed as seen in FIG. 3), while the percentage of the impurity in the exiting gas drops, the electrode is also exposed to a sufficient mole fraction percentage of oxygen throughout the entire cell so that a high level of average current density and voltage is continuously obtained. This is best seen in FIG. 4, wherein cells operating at 1% and 2% direct, continuous bleed rates show improved voltage and average current density characteristics against time (curves on the right), as compared to prior art cells in the no-bleed mode (left-hand curve). The twice-input bleed rate (2% in the case of this example) shows evceedingly good characteristics of constant current density and voltage output in time. With a low bleed rate approximately equal to the percentage of impurity in the input gas, an acceptable current density, that does not decrease in time is reached in our cells. Where the rate of bleed is slightly greater than the percentage of inerts coming in with the reactant gas, the electrical characteristics of the cell are improved still further as seen from FIG. 4. Thus, with hardly any loss of cell efficiency, an acceptable performance level is achieved without the necessity of periodic or recycle purging, or the provision of the complicated equipment needed to accomplish such purging method. It should be noted that while the 2% bleed rate results in a direct loss of more reactant than the 1% bleed rate, the remaining 98% of reactant is used at an average voltage 0.060 volts higher than that obtained with a 1% bleed rate. Thus, about a 7% higher voltage efficiency is achieved with the reactant consumed resulting in an overall efficiency gain of about 6%. It is also clear that, in this example, bleed rates higher than 2% would yield negligible improvement in voltage efficiency. It should be further noted that at no time does the average current density or average voltage of the prior art cells in the no-bleed portion of the operation exceed the values for the continuous bleed of the present invention.

Figure 5:
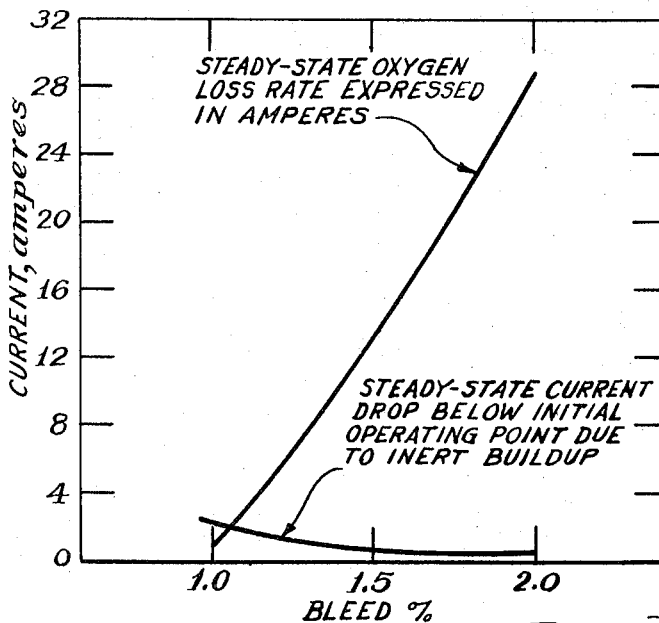

FIG. 5 shows that the optimum fuel utilization efficiency occurs at a bleed rate which is just slightly higher than the percent impurity input. The bleed rate used in the above examples is defined to be a specific constant percentage of the nominal operating point consumption rate, in this case 150 ma./sq. cm. The lower curve in FIG. 5 illustrates that with increasing bleed rate the amount of drop in the steady state current below the initial average current density (149.8 milliamps per sq. cm.) also decreases.

Although we do not wish to be bound by theory, this reduction in the steady state current drop with increasing bleed rate appears to be due to the fact that a greater percentage of the entire electrode area is blanketed with the available reactant gas at a concentration sufficient to be fully utilized by the electrode. However, because the gas exiting the continuous bleed opening is more pure with respect to oxygen, more oxygen is leaving before being converted at the electrode surface. This oxygen may be considered to be "wasted," and if converted to current, the amount of wasted current increases with bleed rate. The intersection of the two curves identifies the point of lowest steady-state current drop at the least waste of fuel. This point is identified by us as a "maximum fuel utilization point" and identifies how much current is being wasted at that bleed percentage.

However, where the continuous bleed is to a low pressure container (as container 13 in FIG. 3a) the oxygen may be recovered. In such modification, the percentage bleed rate may be increased to reduce the amount of steady state current drop as shown in the lower curve in FIG. 5. Although the steady state oxygen loss rate expressed in amperes would be increased according to the upper curve in FIG. 5, the recovery of the oxygen would reduce that loss rate.

Figure 3A:
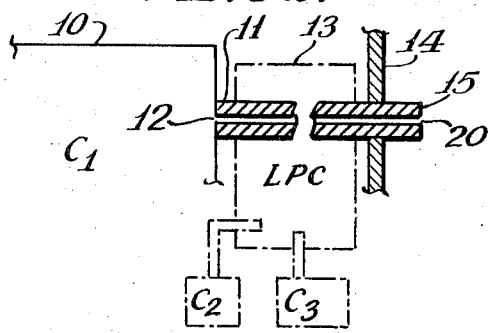

Turning now to FIGS. 3a through 3d, these figures represent specific typical constructions of the direct, continuous bleed apparatus of this invention. As shown in FIG. 3a, fuel cell $C_1$ having electrode chamber 10 is provided with a continuous bleed tube 11 at the end opposite the reactant gas input end. The continuous bleed tube 11 has a calibrated opening 20 therethrough, the size of opening and length of tubing being chosen to give the desired purge rate. For example, for the aforementioned cell parameters, the tubing may be 8 mil O.D., 4 mil I.D. commercially available stainless steel hypodermic needle type tubing, from 1 to 2 feet in length for bleed rates varying from 2% to 1% respectively. Generally the bleeds may be calibrated according to formulas such as:

$$\dot{Q} = 2.36 \times 10^{10} \Delta P r^4 / \mu L \quad (11)$$

where Q is the bleed gas flow rate in cu. ft./hr.; ΔP is the pressure drop in p.s.i. in the bleed capillary of radius r feet and length L feet and μ is the bleed gas viscosity. Alternatively, well known fixed orifice flow devices may be employed.

In one embodiment, the continuous bleed tube extends to the exterior of the power producing device, extending to, or through the outer wall 14, and terminating in a straight end 15 at or exterior of the wall 14, with the bleed gases exiting through opening 20. In another embodiment, the fuel cell $C_1$ may be bled to a low pressure container 13, and thence to the exterior, or the gases may be periodically flushed or recovered from the low pressure container. In still another embodiment, fuel cells $C_2$ and $C_3$ also exhaust to a common low pressure container, which thence may exhaust to the exterior via tube 15, or be recovered or flushed as desired.

Figure 3B:
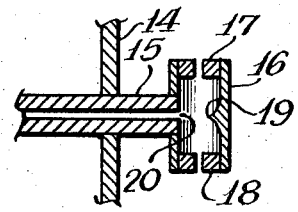
Figure 3C:
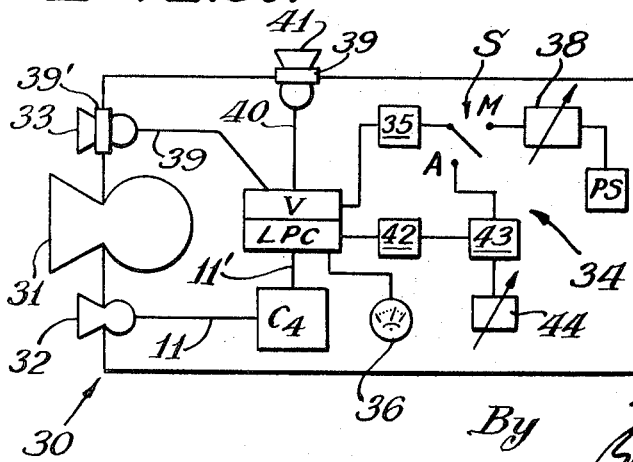

FIG. 3b shows a still further embodiment particularly useful in satellites and other space vehicles where the bleed percentage is considerable or the flight sufficiently long that a continuous bleed would produce a continuous, although small, force in a given direction necessitating orbit correction. To obviate the necessity of correction, the bleed tube 15 terminates in a T, 16, having in-line, performated end plugs 17 and 18. The bleed gas passing out opening 20 is deflected by deflector 19 (optional), and passes outwardly through the openings in the end plugs. Since the end plug openings are aligned, the forces produced by the gases exiting from each of the plugs 17 and 18 would be equal and opposite, thus cancelling their effect. In another embodiment, the continuous bleed of gas as delivered from the cell can be advantageously used to supplement the existing gas thrusters used in satellites and spacecrafts for purposes of navigation, orientation (pitch, yaw, roll, stabilization, bar-b-Q mode, and artificial gravity producing rotation), or propulsion (translation). The continuous gas exhaust can be used for primary thrust, altitude control, or cause corrections, in an amount determined primarily by the size of the spacecraft and amount of gas purged. This latter embodiment is illustarated in FIG. 3c which shows fuel cell $C_4$ mounted in spacecraft 30 which has a main thrust 31. Bleed tube 11 may be connected directly to auxiliary constant thrust means 32, or alternatively, to auxiliary controllable trust means 33 via servo-mechanism 34. The servo-mechanism includes for example, a low pressure chamber LPC into which the bleed tube 11' feeds, and a valve means V, controllable at either automatically or manually by positions of switch S to either position A or M respectively. In the manual position control means 35 is connected to power source PS via adjustment means 38, which may be operator selected by refercene to display device 36. In the automatic mode, a presettable or selectable reference means 44 receives signal from the LPC via transducer 42 and error detector 43, and feeds back via control means 35 to operate valve V. The circuitry may be electrical or fluidic in nature and the servo-control mechanism 34 may monitor and control LPC pressure, flow rate in tube 37, or thrust of thrust means 33. For altitude or navigation control a bleed line 37 or 40 feeds to vernier-type thrusters 33 or 41 (reaction engine cluster) mounted on directional gimbals 39, 39', conventionally controllable for the desired direction of thrust. Alternatively the valve V may be integrated into the thrust means 32, 33 or 44, and the control means may include timing devices to provide a preset sequence of operation.

Figure 3D:
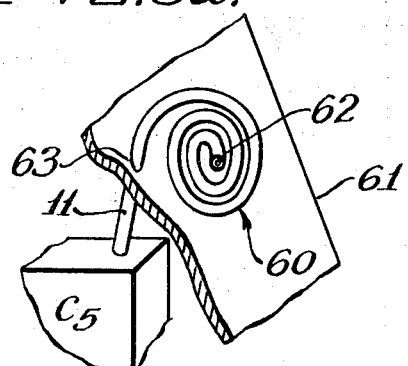

FIG. 3d shows a bleed tube 11 from cell $C_5$ which is in the form of a coil 60 at the exterior of spacecraft 61 to provide for a calibrated resistance to the bleed gas flow in the line. In one form the coil may have an upturned end 62, and preferably exits from the interior of the craft at an acute angle (as shown at 63) to remain relatively close to the surface while obviating kink-producing sharp bends. Alternatively, the coil may be placed between the cell 10 and the exterior wall 14, with the end of the bleed line terminating either straight as in FIG. 3a, or in a T as in FIG. 3b. Still further, conventional types of bleed valves may be employed where desired.

Loss of KOH from the adjacent electrode chamber, here the anode chamber A (FIG. 1), may, under some circumstances of operation, become substantial. This can be reduced or prevented by providing a hydrophobic fitting, section, or junction in the bleed tube, preferably where the bleed tube, as tube 11 in FIG. 3a, connects to the bleed port in the chamber 10. The junction or fitting may be made of any relatively hydrophobic material, such as Teflon, a Kel-F type copolymer, polyethylene, polypropylene, nylon, or other polymer by standard techniques of casting, machining or the like.

While the present invention has been illustrated with respect to a rectangular fuel cell, it may be appreciated that fuel cells of other configurations, such as circular or irregular, as space and weight configurations dictate, may be utilized. For example, in the case of a fuel cell having an electrode and anode chamber of circular cross section, the fuel gases input to the electrode chamber may be in the center, and a plurality of continuous bleeds may be spaced equally around the perimeter. A plurality of feed inlets and bleed outlets may be provided in a given cell or given electrode chamber. It is also contemplated that in a single cell or single electrode chamber, the reactant gas inlet or inlets may be of different sizes, and likewise the bleed outlets or orifices may also be of different sizes, the positioning and size being determined by the steady-state concentration values desired for a given position in the cell. Thus, for example, it may be desired to have a substantially straight line steady state concentration distribution curve through the entire cell at a fixed maximum percentage of impurities by appropriate placement of numerous bleed orifices. It should be understood that in the above discussion, where a bleed orifice size is mentioned, the important thing is the flow characteristics of the bleed means chosen. Whereas two bleed means may have the same orifice size, the length of the tubing may govern their ultimate flow characteristics in terms of percentage bleed.

Having described our invention, those skilled in the art will recognize that various modifications may be made thereto within the skill of the art and we intend our invention to be limited solely by the following claim.

We claim:
1. A fuel cell assembly having a plurality of gas retaining electrode chambers connected in parallel to a source of reactant gas comprising:
   (a) a plurality of gas-retaining electrode chambers of the dead-ended type adapted to receive an electrode selected alternately from an anode and a cathode respectively,
   (b) an electrolyte chamber disposed between each of said cathode and anode containing chambers,
   (c) commonly manifolded inlets for reactant gas containing a minor amount of an impurity or inert gas connected to each type of said electrode chambers from a source of reactant gas supply and disposed in a first portion of said gas chambers, and
   (d) means for continuous bleed of gas from said anode or said cathode chamber in direct communication with said chamber,
   (e) said continuous bleed means being disposed in a second portion of said gas chamber,
   (f) said second portion being spaced apart from and disposed oppositely of said inlet, and
   (g) said bleed means being a tube, said tube being dimentioned to provide a predetermined tube diameter and length for removal of gas from said chamber at a rate of from approximately equal to said percentage of said impurity of inert to about five times said percentage, and being the sole means for removal of said gas,
   (h) said continuous bleed means being predetermined to provide a constant bleed rate from the electrode chamber with which it is in communication, whereby, a predetermined, steady state impurity concentration distribution is maintained in said gas chambers, the operating power to weight ratio of said cell is improved, and the average current density and voltage do not exhibit periodic drop off following periodic purging.

References Cited
UNITED STATES PATENTS

| | | | |
|---|---|---|---|
| 3,407,095 | 10/1968 | Fuda et al. | 136—86 DD |
| 3,375,140 | 3/1968 | Oswin | 136—86 DD |
| 3,589,941 | 6/1971 | Eaton et al. | 136—86 R |
| 3,411,951 | 11/1968 | Gelting | 136—86 R |

ALLEN B. CURTIS, Primary Examiner

H. A. FEELEY, Assistant Examiner

U.S. Cl. X.R.

136—86 B